(12) United States Patent
Aoki et al.

(10) Patent No.: US 9,709,666 B2
(45) Date of Patent: Jul. 18, 2017

(54) BEAM INFORMATION GENERATING DEVICE, RADAR RECEIVER, AND RADAR RECEIVING METHOD

(71) Applicant: KABUSHIKI KAISHA TOSHIBA, Minato-ku (JP)

(72) Inventors: Tomomi Aoki, Yokohama (JP); Yasuhiko Tanabe, Kawasaki (JP); Kazuaki Kawabata, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 386 days.

(21) Appl. No.: 14/462,963

(22) Filed: Aug. 19, 2014

(65) Prior Publication Data

US 2015/0241556 A1 Aug. 27, 2015

(30) Foreign Application Priority Data

Feb. 26, 2014 (JP) ................. 2014-035724

(51) Int. Cl.
*G01S 13/95* (2006.01)
*G01S 7/40* (2006.01)
*G01S 13/00* (2006.01)
*G01S 13/02* (2006.01)

(52) U.S. Cl.
CPC .......... *G01S 7/4008* (2013.01); *G01S 7/4021* (2013.01); *G01S 7/4026* (2013.01); *G01S 13/003* (2013.01); *G01S 13/951* (2013.01); *G01S 2013/0245* (2013.01)

(58) Field of Classification Search
CPC .... G01S 7/4008; G01S 7/4021; G01S 13/003; G01S 7/4026; G01S 2013/0245; G01S 13/951

USPC ................... 342/26 R, 26 A–26 D
See application file for complete search history.

(56) References Cited

U.S. PATENT DOCUMENTS

| 3,885,237 | A | * | 5/1975 | Kirkpatrick | ............... | G01S 1/02 342/159 |
| 7,205,928 | B1 | * | 4/2007 | Sweet | ................... | G01S 13/953 342/118 |
| 2005/0272472 | A1 | * | 12/2005 | Goldberg | .............. | H04W 16/28 455/562.1 |

(Continued)

FOREIGN PATENT DOCUMENTS

JP 2001-208837 A 8/2001

OTHER PUBLICATIONS

Office Action issued Aug. 14, 2015 in Japanese Patent Application No. 2014-035724 (with English language translation).

(Continued)

*Primary Examiner* — John B Sotomayor
(74) *Attorney, Agent, or Firm* — Oblon, McClelland, Maier & Neustadt, L.L.P.

(57) ABSTRACT

According to one embodiment, there is provided a beam information generating device including: a distance calculator that calculates distances, from a receiver, along a plurality of reception beams formed by the receiver to a transmission beam, based on transmission beam information; and a beam width calculator that calculates beam widths of the reception beams based on the distances calculated by the distance calculator so as to restrain variations in volume enclosed by the transmission beam and the reception beams.

10 Claims, 8 Drawing Sheets

(56) References Cited

U.S. PATENT DOCUMENTS

2014/0333491 A1* 11/2014 Behroozi ............. H01Q 1/1264
                                                            343/706
2016/0226573 A1*  8/2016 Behroozi ........... H04B 7/18504

OTHER PUBLICATIONS

Office Action issued Jan. 30, 2015 in Japanese Patent Application No. 2014-035724 (with English language translation).

* cited by examiner

BEAM INFORMATION GENERATING DEVICE, RADAR RECEIVER, AND RADAR RECEIVING METHOD

CROSS-REFERENCE TO RELATED APPLICATIONS

This application is based upon and claims the benefit of priority from Japanese Patent Application No. 2014-035724, filed Feb. 26, 2014; the entire contents of which are incorporated herein by reference.

FIELD

Embodiments described herein relate to a beam information generating device, a radar receiver, and a radar receiving method.

BACKGROUND

Bistatic radars include a radar transmitter and a radar receiver that are remotely disposed to perform transmission and reception between remote positions.

It is known that bistatic radars use, as beams of the receiver, a wide-angle beam that covers all the area of a transmission beam or use a multi-reception beam in which a plurality of narrow-angled reception beams are formed with respect to all the areas in a transmission beam. Using the multi-reception beam can enhance a reception gain as compared with using the wide-angle beam, and can enhance a spatial resolution. However, the number of reception beams increases, and the scale of the device increases, which is problematic.

Thus, techniques for reducing the number of multi-reception beams have been proposed. For example, reduction criteria of the number of reception beams such as a signal detection rate and an angle measurement precision are provided, and the values such as a signal detection rate and an angle measurement precision are observed. Until the observed values satisfy the criteria, the beam widths continue to be widened. It is thereby possible to reduce the number of reception beams while satisfying a required minimum reception performance, resulting in reducing the scale of the device.

In bistatic radars used for detecting objects for aircrafts, vessels, or the like, such a method is effective in reducing the number of reception beams, but in the case of bistatic radars for meteorological observation (bistatic weather radars), there is a problem in which the observation cannot be performed with high precision by such a method.

Bistatic weather radars have received radio waves reflected by raindrops (scattering particle) which are in the volumes enclosed by a beam from a transmitter and beams from a receiver. Since an observed signal is a composition of scattered signals from the particles in the observed area, weather conditions are estimated by statistics of observed signal in weather radar. For this reason, if there is a large deviation in the observed volumes at which the transmission beam intersects the reception beams, the statistical properties are not even, in other words, variations in precision of The observation arise between the observed areas. In the above-described method that has been proposed, the deviation in the volumes of the observed areas readily arises, and thus the variations in precision of the observation arises, which makes observation with high precision difficult.

DETAILED DESCRIPTION

According to one embodiment, there is provided a beam information generating device including: a distance calculator and a beam width calculator.

The distance calculator calculates distances, from a receiver, along a plurality of reception beams formed by the receiver to a transmission beam, based on transmission beam information.

The beam width calculator calculates beam widths of the reception beams based on the distances calculated by the distance calculator so as to restrain variations in volume enclosed by the transmission and the reception beams.

Embodiments will be described below with reference to the drawings.

(First Embodiment)

Figure 1:
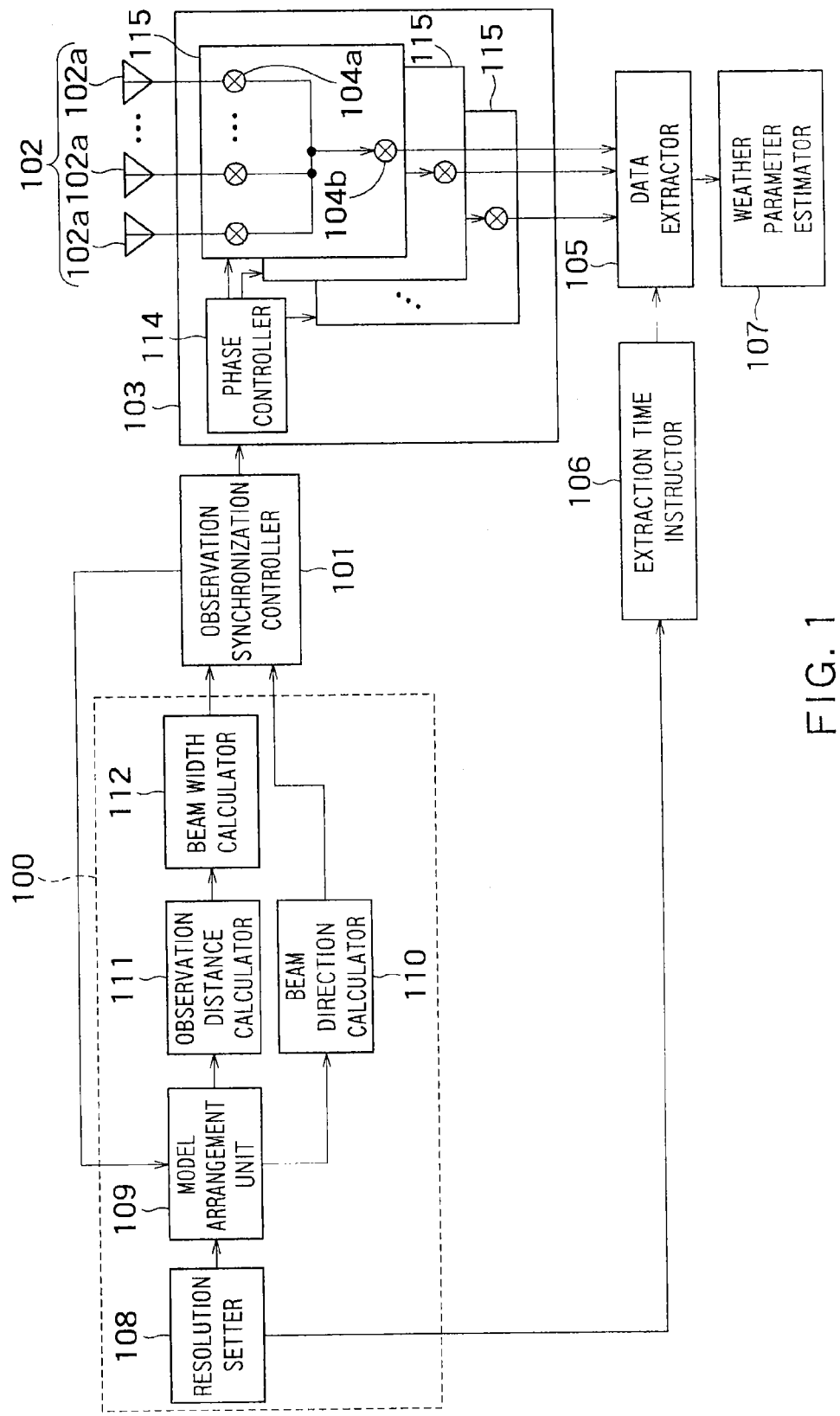
FIG. 1 is a block diagram of a radar receiver including a beam information generating device according to a first embodiment.

FIG. 1 is a block diagram of a radar receiver including a beam information generating device according to a first embodiment.

The radar receiver in FIG. 1 includes a beam information generating device 100, an observation synchronization controller 101, a reception beam antenna 102, a beam generating unit 103, a data extractor 105, an extraction time instructor 106, and a weather parameter estimator 107.

The beam information generating device 100 includes a resolution setter 108, a model arrangement unit 109, an observation distance calculator 111, a beam width calculator 112, and a beam direction calculator 110.

The radar receiver in FIG. 1 forms a plurality of reception beams toward directions to be observed in transmission beam transmitted by a transmitter, and receives reflected signals of the transmitted signal using the plurality of reception beams to estimate weather conditions in the observed area. The transmitted signals are, for example, pulse signals as the transmission beam transmitted from the transmitter.

In the present embodiment, observation is performed for each area divided by space and time domain. Specifically, by using the plurality of reception beams, the area is divided for each reception beam. Furthermore, in a single reception beam, the area is divided in a beam direction (time direction) according to predetermined time intervals. The observation is thereby performed for each subarea. At this point, the beam widths of the reception beams are calculated such that variations of each observed area are restrained. It is thereby possible to perform an observation with high precision, since the variations (unevenness) in observed volume are restrained even if the distance from the receiver to the observed area significantly differs among the reception beams.

Note that the transmission beam from the transmitter may be successively moved with time in either or both of an elevation direction or an azimuth direction. The radar receiver may accordingly observe, in accordance with the direction of transmitted beam, the observed area in the transmission beam using the plurality of the reception beams to estimate the weather conditions.

The present embodiment will be described below more in detail.

The resolution setter 108 sets a value associated with a spatial resolution to be a reference for the observation. Here, a first set value is set, and the value is correlated with the size of cross section of the reception beam (a resolution in a direction orthogonal to the beam). Moreover, a second set value is set, and the value is correlated with the resolution in the beam direction of the reception beam. For example, the first and second set values are a spatial length. Any unit may be used therefor, which includes, for example, meter or centimeter. The setting may be performed by a user's inputting with inputting means, or the first and second set values may be read from storage means (not shown).

The model arrangement unit 109 sets an area to be observed in the transmission beam on the basis of transmission beam information on the transmitter. The transmission beam information is retained in the observation synchronization controller 101, and obtained from the observation synchronization controller 101. Alternatively, the transmission beam information may be obtained from a storage device (not shown). The observed area may be set as an area within a certain range from the transmitter, in the transmission beam, may be set by a user from the outside thereof, or may be set by another method.

The model arrangement unit 109 arranges a plurality of models each having a three-dimensional shape in the observed area Here, cubes are arranged as the models. The length on a side of each cube is set at the first set value set by the resolution setter 108.

The model arrangement unit 109 arranges cubes, in the observed area. As one example, the cubes having the same size are virtually arranged so as to be filled in the observed area (now, no gap is left in the area). At the edge of the observed area, portions of some cubes may be protruded from the area. Alternatively, the cubes may be arranged so as not to be protruded from the observed area (so as to leave gaps at the edge of the area).

The cubes may be arranged by the segmentation of the observed area into a plurality of cubes. In this case, the shape of an area including the edge of the area to be observed may not become a cube, but this may be allowed.

In addition, the cubes may be arranged in a scattering manner only in an area particularly intended to be observed in the observed area.

In the above description, it is a cube that is arranged as the model, but the model is not necessarily a cube. The model may be, for example, a sphere, a cylinder, or may have another shape. In the case of a sphere, a value representing the diameter or radius of the sphere may be set at the first set value by the resolution setter 108, and spheres each having a size based on the set value may be arranged. In the case of a cylinder, a value representing the diameter or radius of the base circle of the cylinder and a value of the height of the cylinder may be set at the first set value by the resolution arrangement unit 108, and cylinders based on the set values may be arranged.

The beam direction calculator 110 determines a direction from the position of the receiver toward each cube in the observed area as the direction of the reception beam. As an example, a direction from the position of the receiver toward any position on the surface of or inside a cube is determined as the direction of the reception beam. For example, a direction from the position of the receiver toward the center of gravity of each cube is determined as the direction of the reception beam.

The observation distance calculator 111 calculates a distance from the position of the receiver to each cube in the observed area to be observed. The reference position of each cube in calculating the distance may be any predetermined position. For example, the reference position may be the center of gravity or any apex of each cube, or any position on an outermost line showing the contour of each cube viewed from the position of the receiver. The reference position may be the same position as that at the time of determining the beam direction. The method of determining the reference position may be applied to all the cubes.

The beam width calculator 112 calculates the width of the reception beam formed toward each cube (beam width) on the basis of the distance calculated by the observation distance calculator 111 and the first set value. The width of the reception beam is expressed in radians, as an example, but is not limited to this.

As an example, when the first set value is denoted by "A1" and a distance to a cube is denoted by "R," the width of reception beam may be calculated as "A1/R" (radians). This is an example in which the width of reception beam is considered as a width of a sector having a radius of "R" and an arc length of "A1." The width of reception beam may be calculated as "(A1+α)/R" wherein a certain value "α" is added to "A1," may be calculated as "(A1√2)/R" using a length "A1√2" of a diagonal of a square having a length "A1" on a side thereof, or may be calculated by another method. For example, the width of reception beam may be calculated as "$\sqrt{(R^2-(A1/2)^2)}$" assuming an isosceles triangle (or cone). "A1" can be considered to be a value correlated with the size of the reception beam (e.g., size of the cross section thereof). In the example, the reception beam is assumed to be symmetrical to a radial direction, but is not limited to this. Calculating the beam by the method described here allows the cross sections of the cubes to have a substantially equal size.

Although a three-dimensional shape is used to determine beam direction in the above example, there may be a plurality of positions (points) set in the transmission beam. In this case, distances from the receiver to the plurality of positions in the transmission beam are calculated, and the beam widths of reception beams formed in conformity with directions from the receiver toward the positions are calculated on the basis of the distances to the positions and the first set value. For example, the beam widths are calculated as "the first set value/distance." This restrains the variation of the cross section areas between the reception beams according to the positions.

The observation synchronization controller 101 retains information on the transmission beam. For example, information to identify the transmission beam such as the width of the transmission beam and the direction of the transmission beam is retained. The observation synchronization controller 101 further retains position information on the transmitter. In addition, in the case where the transmission beam is moved with time, the observation synchronization controller 101 retains information on the direction and the beam width of the transmission beam corresponding to time.

The observation synchronization controller 101 obtains the information on the beam directions of the reception beams from the beam direction calculator 110, and obtains the information on the beam widths of the reception beams from the beam width calculator 112. The observation synchronization controller 101 manages the information on the beam directions and the beam widths of the reception beams as beam information on the reception beams. The observation synchronization controller 101 outputs the beam information on the reception beams (beam directions and beam widths) to the beam generating unit 103. In the case where the transmission beam is moved with time, the beam information on the reception beams corresponding to time is identified and output to the beam generating unit 103. The reception beams are thereby formed in synchronization with the transmission beam.

Here, if there are a plurality of reception beams the beam directions of which are the same or close to each other, the observation synchronization controller 101 may determine to select one of these reception beams and not to form the other reception beams. In this case, the observation synchronization controller 101 outputs beam information on the selected reception beam to the beam generating unit 103, and does not output beam information on the reception beams that are not selected. The observation of areas inside the cubes corresponding to these reception beams, which includes the selected reception beam and not including the non-selected reception beam, is performed. Note that, all the area inside the cube is not necessarily observed if a reception beam does not cover a cube completely.

As an example, assume a case where, with respect to the beam direction of a reception beam, a plurality of reception beams exists in a range provided by a user (e.g. the direction of a reception beam ±α). In this case, it is determined that a reception beam having the smallest beam width is selected among these reception beams and the other reception beams are not used. It is thereby possible to satisfy a required minimum resolution in the observation while the number of reception beams is reduced.

The reception beam antenna 102 includes a plurality of antenna elements. The plurality of antenna elements each receive reflected waves of the transmitted signals.

The beam generating unit 103 includes a phase controller 114 and a plurality of phase shifters 115. The phase shifters 115 are connected to the plurality of antenna elements 102 in common.

The phase controller 114 calculates phase control signals (weight coefficients) to be provided to the phase shifters 115 such that the phase shifters 115 each form one corresponding reception beam. More in detail, the phase controller 114 calculates a weight coefficient for each antenna with respect to each phase shifter 115 on the basis of the beam information (the beam direction and the beam width of each reception beam) input from the observation synchronization controller 101. The phase controller 114 provides the weight coefficient calculated for each antenna to each phase shifter 115. Each phase shifter 115 receives the reflected waves of the transmitted signals using the corresponding reception beam thereof via the plurality of antenna elements.

Each phase shifter 115 includes a plurality of multiplexing units 104a each of which is disposed for each antenna, and an adding unit 104b that adds the outputs of the multiplexing units 104a. The multiplexing unit 104a multiplies a signal received from each antenna 102 by the corresponding weight coefficient to obtain a multiplied signal. The adding unit 104b adds the multiplied signals obtained from the multiplexing units 104a. Each phase shifter 115 outputs the added signal to the data extractor 105 as a signal received using the corresponding reception beam.

The extraction time instructor 106 converts the value of the second set value that is set in the resolution setter 108 into a time "Δt." When the second set value is denoted by "A2" end the light speed is denoted by "c," the converted time is "Δt"="A2/c." The second set value may be same as the first set value. In this case, the time Δt is a value of the length on a side of the arranged cube in terms of time.

The data extractor 105 extracts a piece of data every time "Δt" from each received signal input from each phase shifter 115, and obtains the pieces of extracted data ac observation data. For example, the observation data is obtained by dividing the received data at each "Δt" from the beginning thereof. The data extractor 105 stores the obtained observation data therein. Extracted data by every time "Δt" allows for the observation in the direction of the reception beam (radial direction) with a desired resolution. In the received signal, a piece of data extracted earlier is a piece of observation data on an area closer to the receiver in an area enclosed by the reception beam and the transmission beam. That is, the enclosed area is divided by a length of the second set value in the radial direction, and the pieces of observation data are obtained in an order of increasing distance from the receiver to the area.

The weather parameter estimator 107 estimates the weather conditions of the observed area for each subarea using the observation data extracted by the data extractor 105. The subareas are obtained by dividing the area enclosed by the transmission beam and the reception beam in the direction of the reception beam by "Δt." Examples of weather conditions to be estimated include the amount of precipitation, and a wind velocity, but are not limited to these. The method of the estimation used therefor may be widely known methods.

Figure 2:
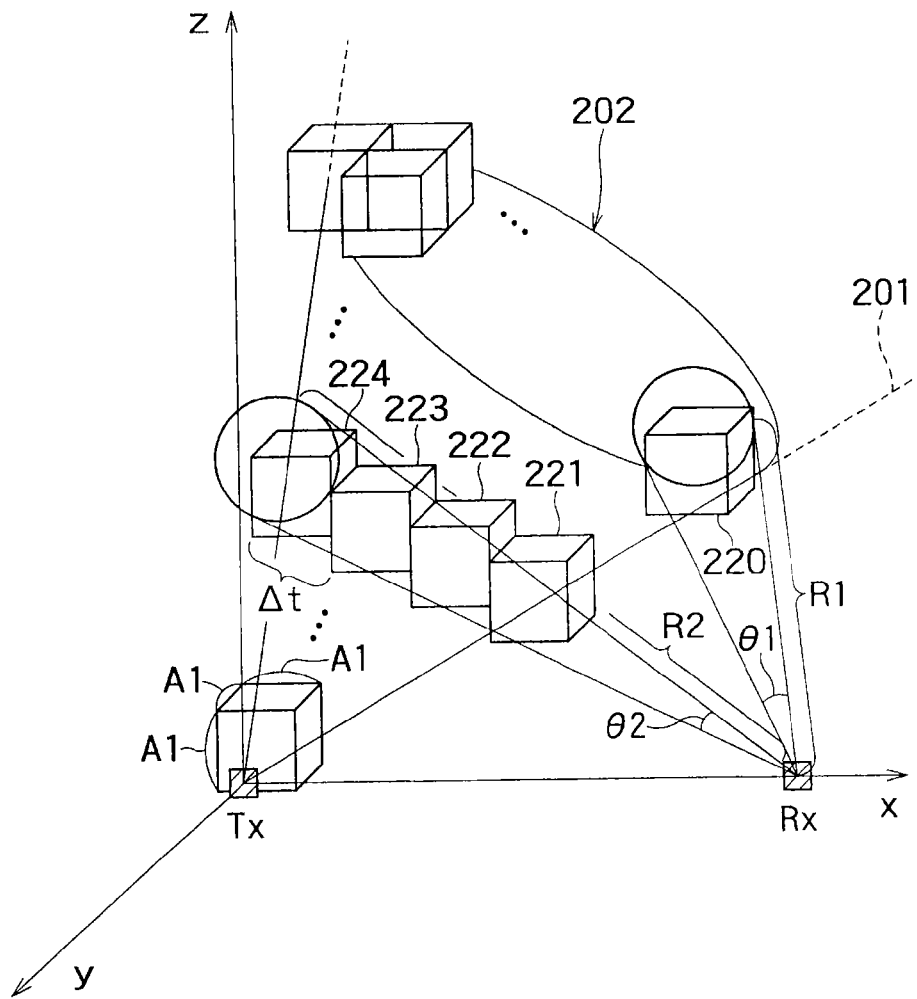
FIG. 2 is a conceptual diagram with respect to a method of setting the directions of reception beams and the widths of the reception beams, and a method of extracting data.

FIG. 2 shows a conceptual diagram with respect to a method of setting the direction of reception beam and the width of reception beam, and with respect to the data extracting method. A transmitter "Tx" is disposed at the origin of "XYZ" space, and the receiver is disposed on an X-axis.

A receiver "Rx" sets an observed area 202 in a transmission beam 201 from the transmitter "Tx."

The receiver "Rx" virtually arranges cubes having the length on a side thereof being the first set value (set at "A1"), in the observed area 202. Here, the cubes are thoroughly arranged so as to fill all the observed area 202.

The receiver "Rx" calculates directions from the position thereof to the cubes. In addition, the receiver "Rx" calculates distances from the position thereof to the cubes. The receiver "Rx" then calculates each of the widths of the reception beams with the above direction as the center on the basis of the calculated distance and the length "A1" on a side of the cube. In the shown example, a distance to a cube 220 is denoted by "R1," and a width "θ1" of the reception beam is calculated on the basis of the distance "OR" and the first set value "A1." In addition, a distance to a cube 224 is denoted by "R2," and a width of the reception beam "θ2" is calculated on the basis of the distance "R2" and the first set value "A1." The receiver "Rx" calculates directions of the reception beams with respect to the cubes.

Figure 3:
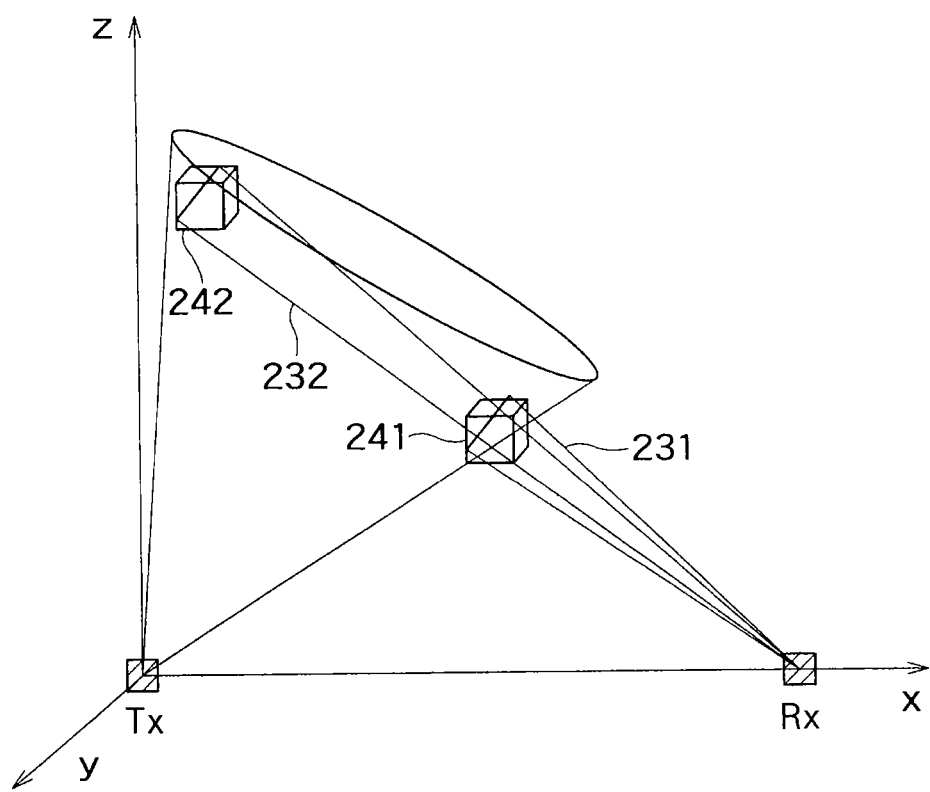
FIG. 3 is a diagram showing an example of selecting one beam when the directions of the beams are the same or close to each other.

Here, if there are a plurality of reception beams the beam directions of which are the same or closer to each other, it is determined that one reception beam having the narrowest width of the reception beams is selected, and the other reception beams are not disposed. In the shown example, it is assumed that the directions of the reception beams for four cubes 221, 222, 223, and 224 are the same or close to each other. In this case, the reception beam for the cube 224 that is farthest from the receiver "Rx," that is, the reception beam having the narrowest beam width is selected and the reception beams for the three cubes 221 to 223 on the near side are not disposed. This will be described in detail with reference to FIG. 3.

There are two reception beams 231 and 232 shown for two cubes 241 and 242. Since the directions of the beams are the same or close to each other, the beam 232 having a narrow width corresponding to the farther cube 242 from the receiver "Rx" is selected. The reception beam 232 also intersects the cube 241, and thus data corresponding to an area of the cube 241 can be extracted from the received signal of the reception beam 232. In such a manner, it is possible to reduce the number of reception beams while the required minimum resolution is satisfied.

In receiving, the radar receiver causes the phase shifters 115 to form reception beams in synchronization with the transmission beam to receive reflected signals of the transmitted signals transmitted on the transmission beam, using the reception beams. The data extractor 105 extracts pieces of data from the received data at time intervals of Δt corresponding to the second set value. The pieces of extracted data are stored in the radar receiver as pieces of observation data on respective subareas in the observed area. Although here, all the pieces of data are extracted at the time intervals of "Δt," pieces of data on only desired subareas may be extracted.

As described above, according to the present embodiment, the widths of reception beams are calculated such that the cross sections orthogonal to the reception beams have substantially the same size in an observed area. Then, pieces of data are extracted at time intervals of "Δt" from the received signal received using the reception beam. It is thereby possible to restrain the variations in volume of the subareas at which the pieces of data are obtained, in the observed area. Therefore, the variations of estimated precision in the observation data can be restrained. For example, it is possible to equalize the numbers of raindrops in subareas to a certain extent, result in getting data less statistical deviation in all observed area. It is thereby possible to perform an observation (wind velocity observation) with high precision.

Note that when an area is segmented in the direction of a reception beam at time intervals of "Δt" because the beam has a shape increasing in width as a distance from the receiver increases, the areas closer to the receiver have smaller volumes. If the degree of difference in volume of this case is allowable in the observation, no problem arises. Note that, as a modification, it is possible to substantially restrain the variation in observation volume by making time interval to observe an area longer as the area is closer to the receiver.

Note that, in the present embodiment, the beam width for a cube closer to the receiver is calculated to be larger than that for a cube farther thereto. Therefore, it may be possible to use the smaller number of reception beams than that in conventional techniques using uniform beam widths.

Figure 4:
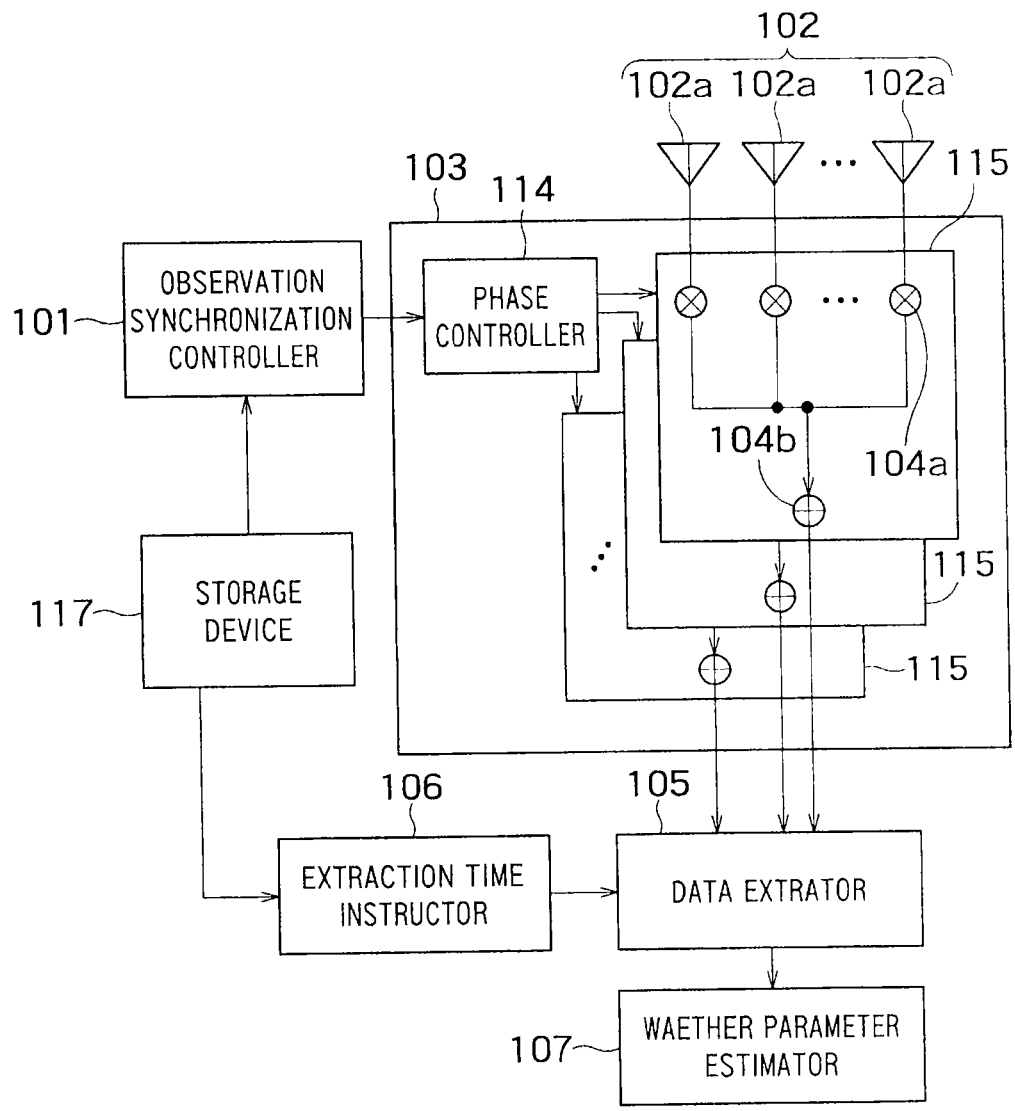
FIG. 4 is a diagram showing a modification of the radar receiver in FIG. 1.

In addition, in the present embodiment, although the radar receiver is mounted with the beam information generating device calculating the widths and the directions of reception beams, the beam information generating device may be separated from the radar receiver. In this case, the beam information may be calculated outside the radar receiver, and only the calculated results may be provided to the observation synchronization controller in the radar receiver. An example of the configuration in this case is shown in FIG. 4. The beam information is stored in a storage device 117, and the observation synchronization controller 101 reads the beam information from the storage device 117.

(Second Embodiment)

In the first embodiment, the widths of reception beams are controlled per beam, which may impose a heavier load on calculating beam information or a heavier processing load on calculating phase control signals in forming the reception beams. A second embodiment aims to reduce these processing loads by using only a predetermined number of beam widths.

Figure 5:
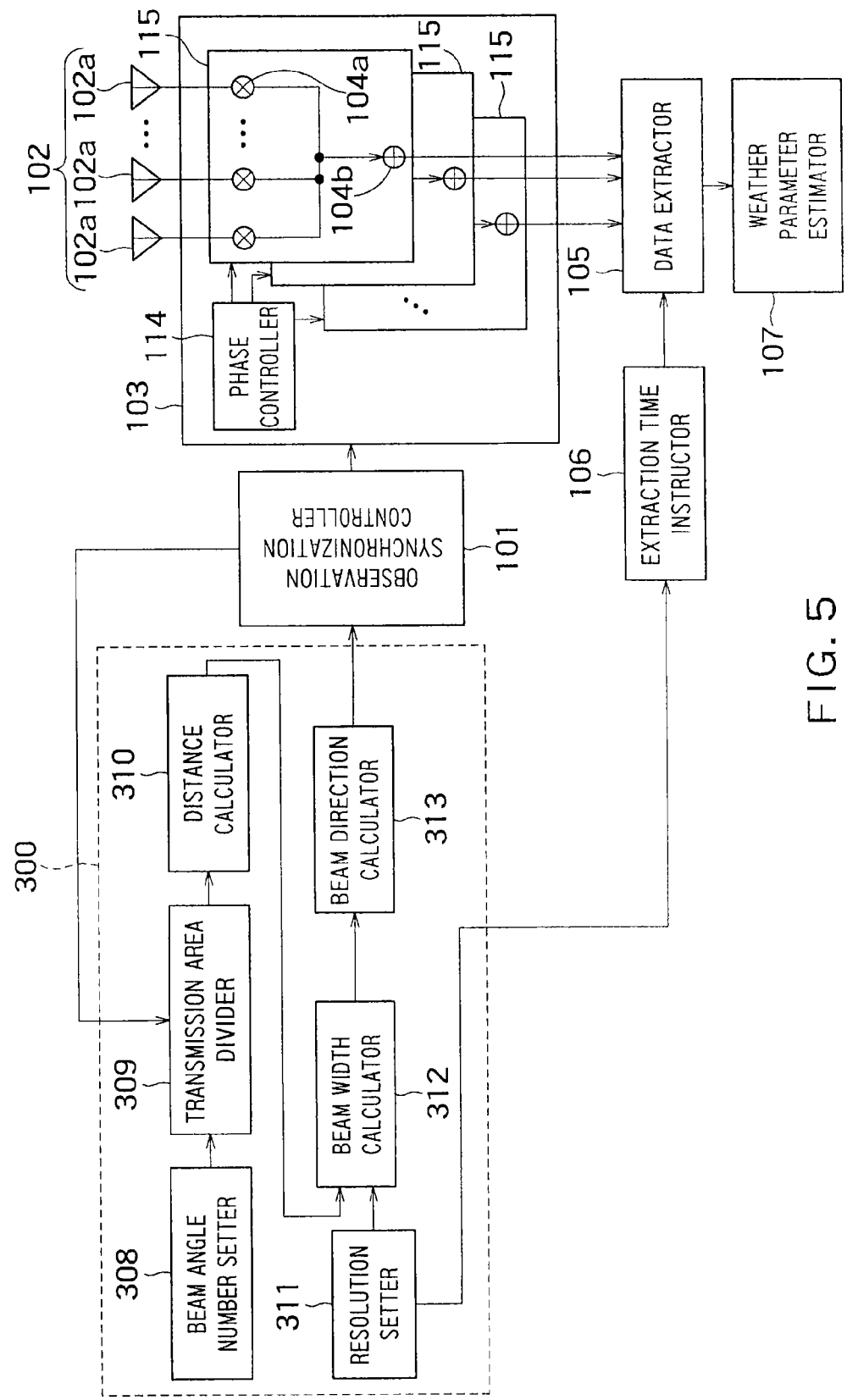
FIG. 5 is a block diagram of a radar receiver according to a second embodiment.

FIG. 5 shows a block diagram of a radar receiver according to the second embodiment. Components operating similarly to those in FIG. 1 are denoted by the same reference numerals, and redundant descriptions thereof will be omitted unless the operations are extended or altered.

The radar receiver in FIG. 5 includes a beam information generating device 300, an observation synchronization controller 101, a reception beam antenna 102, a beam generating unit 103, a data extractor 105, an extraction time instructor 106, and a weather parameter estimator 107.

The beam information generating device 300 includes a resolution setter 311, a beam width calculator 312, a beam direction calculator 313, a beam width number setter 308, a transmission area divider 309, and a distance calculator 310.

The beam width number setter 308 sets the number of beam widths to be used. The number of beam widths may be input into the beam width number setter 308 by a user using inputting means. Alternately, the beam width number setter 308 may read information on the number of beam widths to be used from storage means (not shown).

The transmission area divider 309 obtains information on a transmission beam from the observation synchronization controller 101 to identify the transmission beam, and sets an observed area in the transmission beam. Any method of setting may be used as with the first embodiment.

Then, the transmission area divider 309 calculates an angle-of-view range subtended at the receiver by the observed area. The angle-of-view range may be, for example, a maximum angle range in an elevation direction, or may be a maximum angle range in an azimuth direction, or may be the larger one of the maximum angle range in the elevation direction and the maximum angle range in the azimuth direction.

The transmission area divider 309 divides the calculated angle-of-view range by the number of beam widths. The angle-of-view range may be equally divided or may be divided by any other method. The transmission area divider 309 divides the observed area by planes having the divided angles. The observed area is thereby divided into areas of the above-described number of beam widths.

The distance calculator 310 calculates a distance to a reference position in a divided area obtained by the transmission area divider 309, for example, a distance to a position to which the distance from the receiver is maximum is calculated.

The beam width calculator 312 calculates the width of reception beam to be used for each divided area. As an example, when the distance to the farthest point is denoted by "D1" and the first set value is denoted by "A1," the width of the reception beam is calculated as "A1/D1." This corresponds to the width of a reception beam having an arc of which the length is "A1." It can be considered that the farthest position corresponds to an end of the arc. The first set value is set to the resolution setter 311. Note that the second set value is also set to the resolution setter 311 as with the first embodiment.

The beam direction calculator 313 arranges a plurality of reception beams having the beam widths calculated by the beam width calculator 312 for each divided area, thoroughly in the whole divided area, and calculates the directions of the arranged reception beams. The number of the widths of reception beams is one for each divided area, and the total number of beam widths to be used is identical to the number of divided areas. The beam direction calculator 313 outputs information on the directions and the beam widths of the reception beams that have been set for the observed area, to the observation synchronization controller 301, as reception beam information. Note that, although here, the directions of the reception beams are calculated after the arrangement of the reception beams, the reception beams may be arranged after the calculation of the directions of the reception beams.

Figure 6:
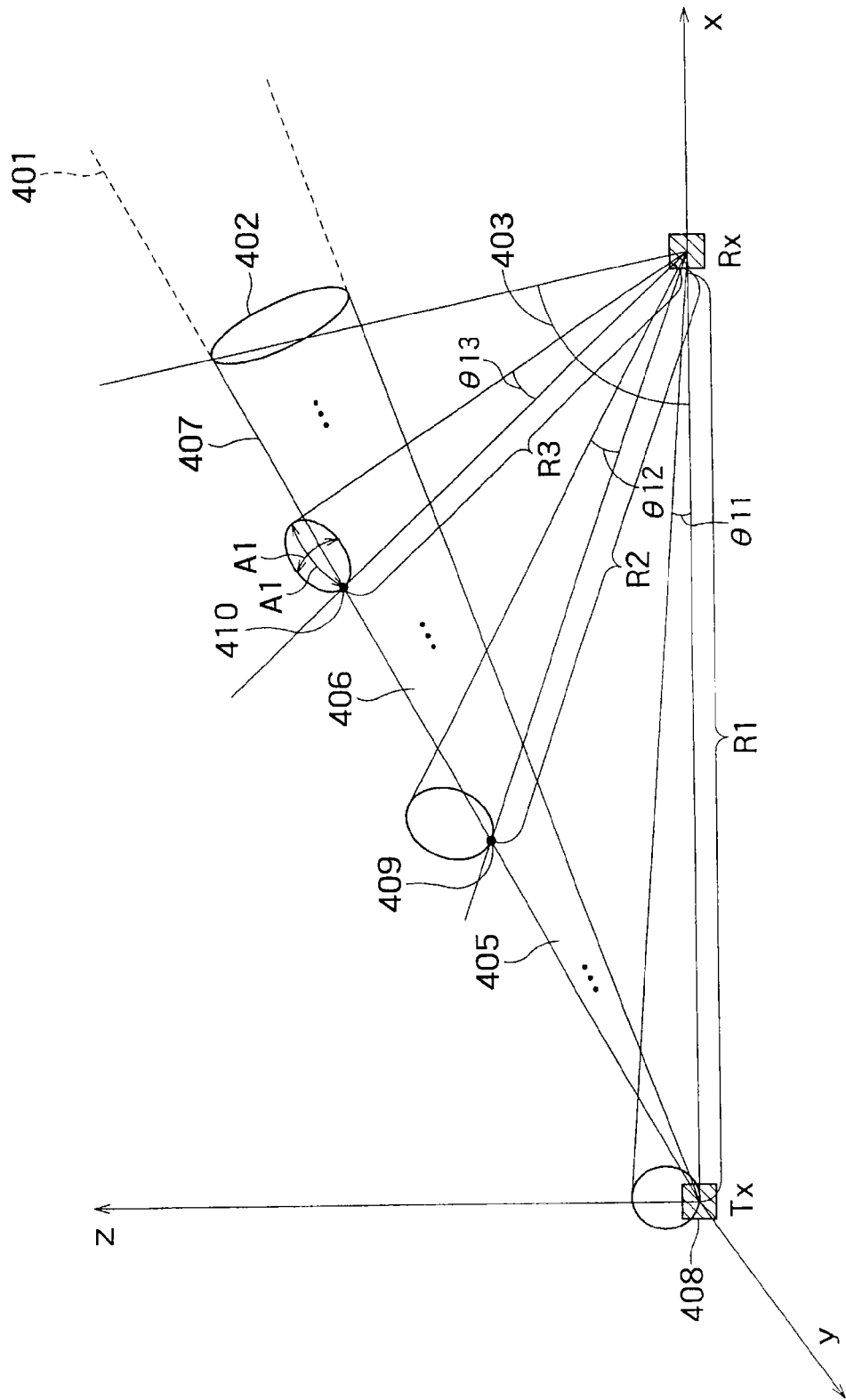
FIG. 6 is a conceptual diagram illustrating a method of calculating reception beam widths according to the second embodiment.

FIG. 6 shows a conceptual diagram for illustrating a method of calculating reception beam widths according to the second embodiment. A transmitter "Tx" is disposed at the origin of "XYZ" space, and the receiver is disposed on an X-axis.

FIG. 6 shows an example in which an observed area 402 in a transmission beam 401 radiated by the transmitter "Tx" is divided into three areas (divided areas 405, 406, and 407). Specifically, a maximum angle range 403 in an elevation direction subtended at the receiver "Rx" is divided into three divided areas, and the observed area 402 is divided along planes each having the divided angle.

The distance calculator 310 identifies positions 408, 409, and 410 each of which has the longest observation distance in each divided area. The distances thereof are "R1," "R2," and "R3," respectively.

The beam width calculator 312 determines beam widths "θ11," "θ12," and "θ13" for the divided areas 405, 406, and 407 using the farthest observation distances "R1," "R2," and "R3" and the first set value set to the resolution setter 311, respectively. The first set value is common to the divided areas. As an example, when the first set value is denoted by "A1," the beam width for the divided area 405 is calculated as "A1/R1," the beam width for the divided area 406 is calculated as "A1/R2," and the beam width for the divided area 407 is calculated as "A1/R3." In this case, the arc length is the first set value, and thus the positions 408, 409, and 410 can be considered to be edges of the arcs. Note that the beam widths may be calculated by a method of calculating other than that described here.

The beam direction calculator 313 arranges reception beams having the beam widths calculated by the beam width calculator 312 for the divided areas 405, 406, and 407, respectively, thoroughly in the elevation direction and the azimuth direction. Rules of the arrangement may be separately determined.

Note that, in the present embodiment, in each divided area, a resolution at a position nearest to the receiver is higher than a resolution based on the first set value (the cross section of the reception beam becomes smaller). For this reason, the number of the reception beams may be increased as compared with the first embodiment. On the other hand, in the present embodiment, the number of beam widths to be used is restrained by fixing the number of widths of the reception beams. For this reason, it may be possible to reduce a calculation load to generate the beam information or a calculation load needed to control the phase shifters in the phase controllers as compared with the first embodiment in which the beam width is arbitrary set for each reception beam.

(Third Embodiment)

In the second embodiment, the same beam width is used for each divided area, which may cause significant variations in observation volume. In addition, a required number of reception beams may be increased, which increases the scale of the device. The present embodiment aims to restrain the variations in the observation volume as compared with the second embodiment to further enhance the measurement precision of data. In addition, the number of reception beams is reduced to increase the possibility of restraining the scale of the device scale.

Figure 7:
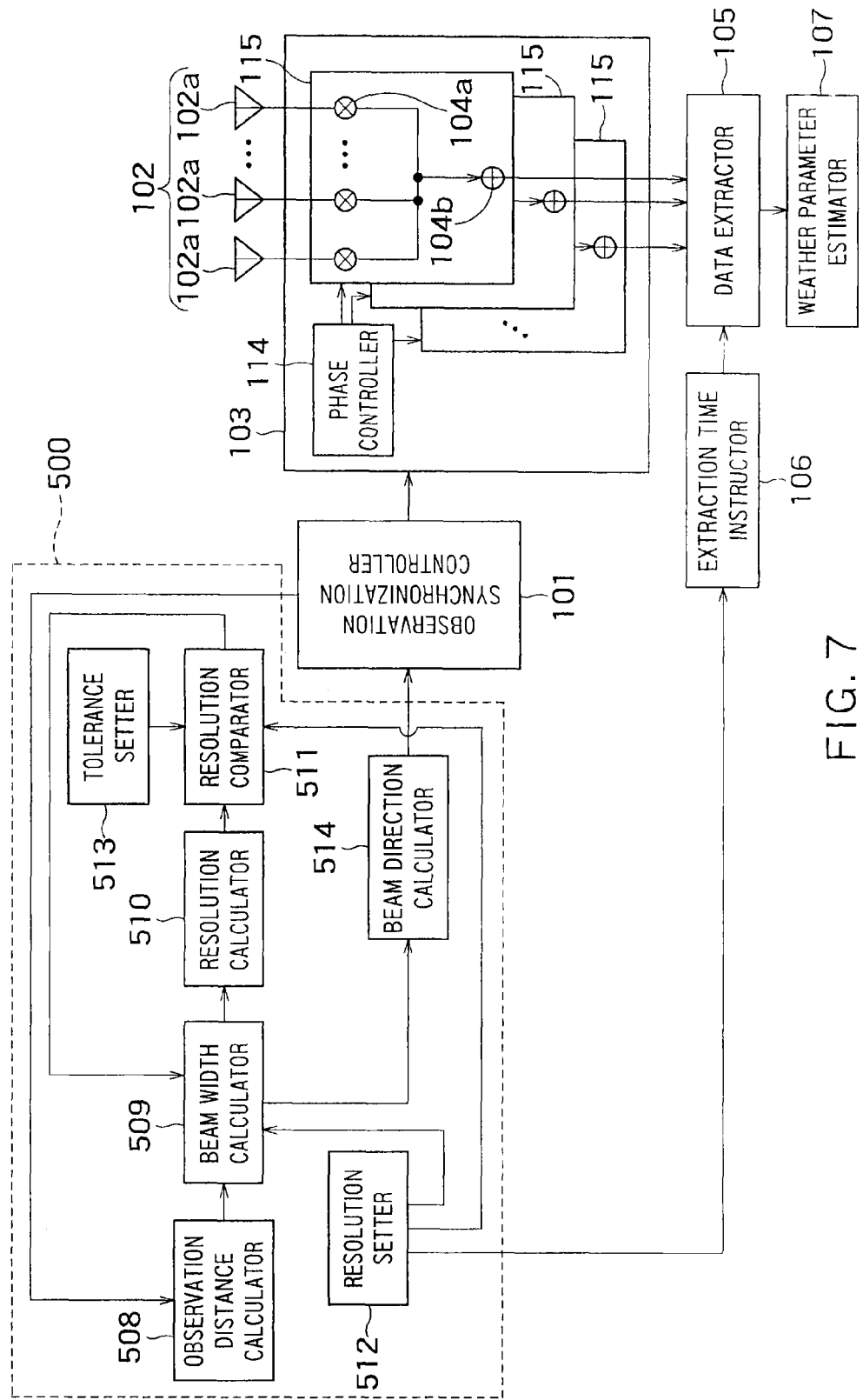
FIG. 7 is a block diagram of a radar receiver according to a third embodiment.

FIG. 7 shows a block diagram of a radar receiver according to the third embodiment. Components operating similarly to those in FIG. 1 are denoted by the same reference numeral, and redundant descriptions thereof will be omitted unless the operations are extended or altered.

The radar receiver in FIG. 7 includes a beam information generating device 500, an observation synchronization controller 101, a reception beam antenna 102, a beam generating unit 103, a data extractor 105, an extraction time instructor 106, and a weather parameter estimator 107.

The beam information generating device 500 includes a resolution setter 512, a tolerance setter 513, an observation distance calculator 508, a beam width calculator 509, a resolution calculator 510, a resolution comparator 511, and a beam direction calculator 514.

The observation distance calculator 508 calculates distances between positions in a transmission beam and a receiver. In addition, the observation distance calculator 508 calculates distances between the transmitter and the receiver.

The beam width calculator 509 calculates the widths of reception beams using the distances calculated by the observation distance calculator 508 and the first set value set by the resolution setter 512. For example, the width of the reception beam is calculated as "the first set value/distance." This corresponds to the case where a center angle of a sector having a radius of the distance and an arc of which the length is the first set value is considered to be the width of reception beam. As an example, the beam width calculator 509 first calculates a distance to the transmitter, and calculates the widths of reception beams on the basis of the calculated distances and the first set value. The beam width calculator 509 arranges the reception beams having the calculated widths of reception beams.

In addition, the beam width calculator 509 determines whether to update the beam width of a reception beam to be next arranged, using the resolution calculator 510 and the resolution comparator 511, and if the beam width is not to be updated, the arrangement of reception beams continues using a current beam width. As an example, a reception beam is arranged with the current beam width so as to adjoin the previously arranged reception beam in an elevation direction. Note that it is determined whether or not a resolution satisfies a predetermined criterion prior to the arrangement using the resolution calculator 510 and the resolution comparator 511, and if the resolution satisfies the criterion, the reception beam is arranged as it is, and if the resolution does not satisfy the criterion, the beam width is recalculated. Note that, for example, the method of arranging reception beams involves arranging a reception beam toward the position of the transmitter, and successively arranging in a direction away from the transmitter. The resolution calculator 510 calculates the resolution of a reception beam on the basis of the beam width of the reception beam and a reference position in an area enclosed by the transmission beam and the reception beam. The reference point is, for example, a position farthest from the receiver. The arc length of the beam width is calculated from a distance between the receiver and the position, and the a current beam width. For example, the arc length when the position is considered to be an edge of the arc is calculated. This is defined as the resolution of the reception beam.

The resolution comparator 511 determines whether or not the resolution (arc length) calculated by the resolution calculator 510 falls within a range that has been set with respect to the first set value in advance. Specifically, it is determined whether or not the resolution falls within a range from "the first set value $-\beta 1$" to "the first set value $+\beta 2$." The values of "$\beta 1$" and "$\beta 2$" are obtained from the tolerance setter 513. The tolerance setter 513 sets "$\beta 1$" and "$\beta 2$" by a user's inputting or by reading from storage means (not shown). Note that the values of "$\beta 1$" and "$\beta 2$" may be the same or different.

The resolution comparator 511 outputs an instruction to maintain the beam width to the beam width calculator 509 if the resolution (arc length) calculated by the resolution calculator 510 falls within the range. If the resolution is out of the range, the resolution comparator 511 instructs the beam width calculator 509 to recalculate the beam widths.

Meanwhile, the beam width calculator 509 recalculates the beam width under the instruction from the resolution comparator 511. As an example, the width of a reception beam having a radius of a distance to a position in an area where no reception beam has been arranged yet in the transmission beam (e.g., position farthest from the receiver) and an arc the length of which is the first set value, is calculated, and the width is determined as the width of reception beam. At this point, for example, the farthest position may be determined as an edge of the arc.

The beam direction calculator 514 calculates the beam direction of the reception beam arranged by the beam width calculator 509. The beam direction calculator 514 inputs information on the width and the direction of the reception beam as reception beam information into the observation synchronization controller 101. Although, in the present embodiment, the direction of the beam direction is calculated after the arrangement of the reception beam, the reception beam may be arranged after the calculation of the direction of the beam direction.

Figure 8:
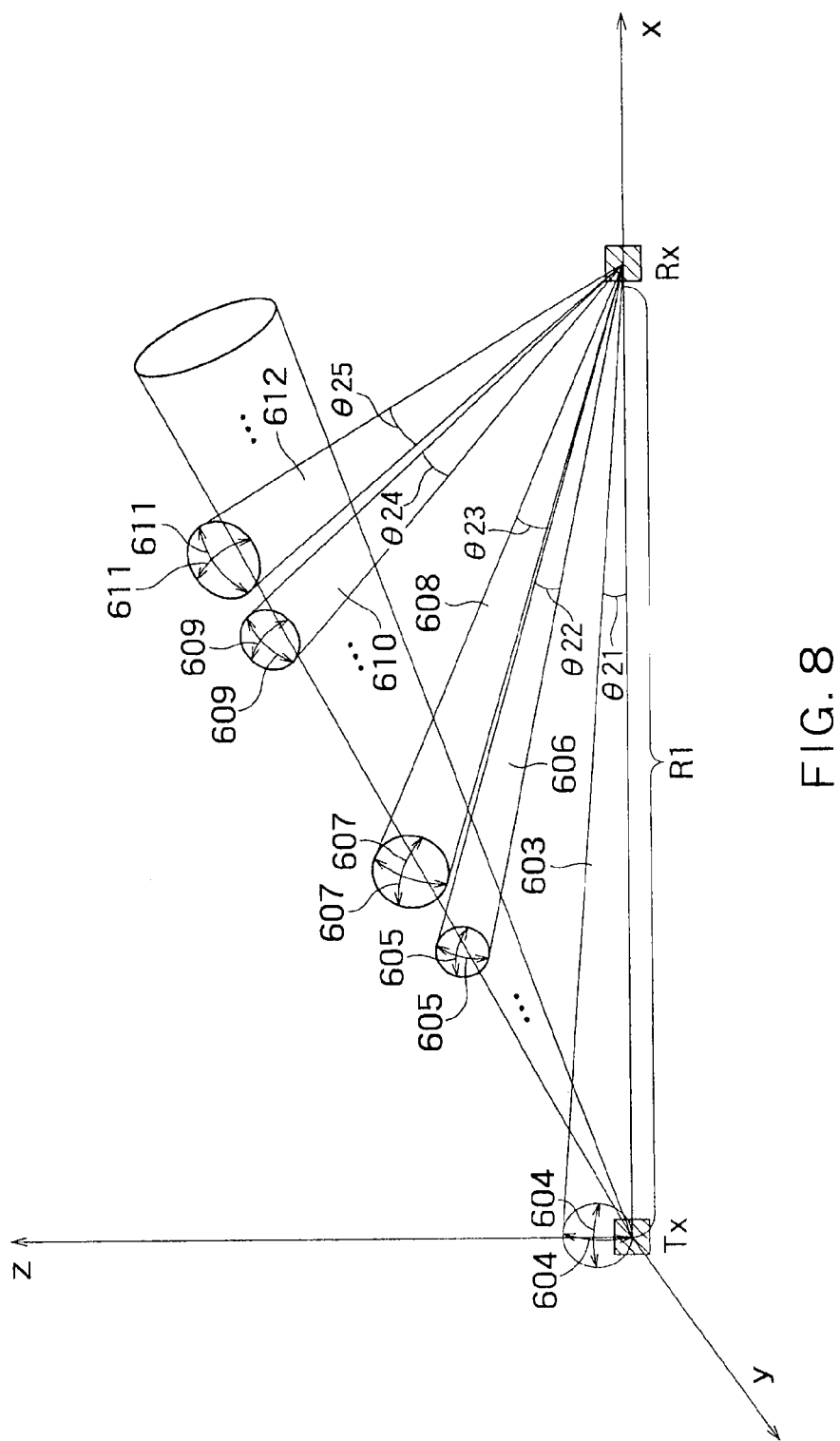
FIG. 8 is a conceptual diagram illustrating an example of a method of calculating reception beam widths according to the third embodiment.

FIG. 8 shows a conceptual diagram for illustrating an example of a method of calculating reception beam widths according to the third embodiment. A transmitter "Tx" is disposed at the origin of "XYZ space," and the receiver is disposed on an X-axis.

The observation distance calculator 508 calculates a distance between the transmitter "Tx" and a receiver "Rx."

The beam width calculator 509 calculates a width "$\theta 21$" of reception beam such that an arc length 604 of a beam edge of a reception beam 603 at the position of the transmitter "Tx" is the first set value.

The beam width calculator 509 arranges the reception beam 603 having the beam width "$\theta 21$," and arranges reception beams thoroughly such that the reception beams are successively away from the reception beam 603. The reception beams are successively arranged along both or at least one of the elevation direction and the azimuth direction in conformity with the shape of the transmission beam. Now, there will be described a case where the arrangement is performed along in the elevation direction.

At the time of arranging the reception beams, it is determined whether to maintain the current beam width, using the resolution calculator 510 and the resolution comparator 511. The resolution calculator 510 calculates the resolution of a reception beam to be arranged. As an example, the resolution is calculated by multiplying a distance to a position farthest from the receiver in the area enclosed by the reception beam and the transmission beam by the current beam width "$\theta 21$." This corresponds to calculating the arc length of a section having a radius of the distance and a center angle of the beam width "$\theta 21$." At this point, the arc length when the farthest position is defined as an edge of the arc is calculated.

The resolution comparator 511 determines whether or not the calculated arc length falls within a range (from "the first set value $-\beta 1$" to "the first set value $+\beta 2$") that has been set with respect to the first set value in advance. The values of "$\beta 1$" and "$\beta 2$" are read from the tolerance setter 513.

If the arc length falls within the range, the beam width calculator 509 maintains the current beam width and arranges the reception beam having the beam width (reception beam having the beam width "$\theta 21$"). Although a reception beam 606 shown in FIG. 6 has an arc length 605 shorter than the first set value, the reception beam 606 is arranged using the current beam width because the length falls within a preset range. A beam width "$\theta 22$" of the reception beam 606 is the same as the beam width "$\theta 21$" of the reception beam 603.

On the other hand, if the arc length does not fall within the range, the beam width is recalculated. For example, the beam width is recalculated on the basis of the distance to the above-described farthest position such that the arc length becomes the first set value. At this point, for example, the farthest position may be considered to be an edge of the arc. A reception beam 608 in FIG. 6 is a reception beam having the recalculated beam width. An arc length 607 of the reception beam 608 is identical to the first set value, and the beam width 023 is a value different from the beam widths "$\theta 21$" and "$\theta 22$."

Although a reception beam 610 in FIG. 6 has an arc length 609 shorter than the first set value, the reception beam 610 is arranged using the current beam width because the length falls within the preset range. That is, a beam width "$\theta 24$" of the reception beam 610 is the same as the beam width "$\theta 23$" of the reception beam 608. In addition, a reception beam 612 in FIG. 6 is a reception beam having the beam width recalculated thereafter. An arc length 611 of the reception beam 612 is identical to the first set value, and a beam width "$\theta 25$" is a value different from the beam widths "$\theta 23$" and "$\theta 24$."

The above-described operation is repeated until the arrangement of the reception beams is completed thoroughly in the observed area.

The beam direction calculator 514 calculates the directions of the arranged reception beams, and outputs information on the widths and directions of the reception beams to the observation synchronization controller 101. The subsequent operations are similar to those of the first embodiment.

According to the third embodiment, it is possible to measure reflected waves from areas having uniform volumes in the observed area as compared with the second embodiment. The variations in measurement precision of the observation data can be thereby restrained.

Furthermore, the beam information generating device may include a CPU (Central Processing Unit), a ROM (Read Only Memory) and a RAM as one example of circuitry. In this case, each unit or each element in the beam information generating device can be controlled by a CPU's reading out into a RAM and executing a program which is stored in a storage or ROM.

Also, the above-stated hardware configuration is one example and a part or all of the beam information generating device according to an embodiment can be realized by an integrated circuit such as a LSI (Large Scale Integration) or an IC (Integrated Circuit) chip set as one example of circuitry. Each function block in the beam information generating device can be realized by a processor, individually, or a part or all of the function blocks can be integrated and realized by one processor. A means for the integrating the part or all of the function blocks is not limited to the LSI and may be dedicated circuitry or a general-purpose processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A beam information generating device which generates beam information required for a receiver to form a plurality of reception beams, comprising:
    processing circuitry configured to:
    arrange a plurality of models at a plurality positions in an area of a transmission beam formed by a transmitter, each of the models having a three-dimensional shape;
    calculate distances from the receiver to the models towards which reception beams are to be formed by the receiver, based on pre-given transmission beam information being information regarding the transmission beam; and
    calculate beam widths of reception beams based on the distances calculated by the processing circuitry and size information of the models.

2. The device according to claim 1, wherein cubes are virtually arranged as the models, and each size information of the models represents a value depending on a length on a side of each cube.

3. The device according to claim 1, wherein the processing circuitry is configured to calculate the beam widths of the reception beams by dividing values representing the sizes of the models by the distances to the models.

4. The device according to claim 1, wherein the processing circuitry is configured to:
    divide an area of the transmission beam into a plurality of areas,
    calculate a plurality of reception beams for each of the plurality of areas, and
    calculate one common beam width for the plurality of reception beams for each of the plurality of areas, based on a distance from the receiver to each of the plurality of areas.

5. The device according to claim 4, wherein the processing circuitry is configured to calculate the one common beam width based on a distance from the receiver to a farthest position in the area for each of the plurality of areas.

6. The device according to claim 1, wherein the processing circuity is configured to:
    successively arrange reception beams having a first beam width for the transmission beam, the reception beams each having a different direction,
    calculate a value of the size of the reception beam within the area of the transmission beam each time the reception beam is arranged, and
    when a calculated value does not fall within a predetermined range, update a beam width from the first beam width to a second beam width so that the calculated value falls within the predetermined range,
    successively arrange reception beams having the second beam width for the transmission beam, the reception beams having the second beam width each having a different direction, the directions of the arranged reception beams having the second beam width being different from the directions of the arranged reception beam having the first beam width, and
    thereafter repeat a similar process.

7. The device according to claim 6, wherein the processing circuitry is configured to calculate a value of the size of the reception beam on a basis of a distance from the receiver to a farthest position in an area enclosed by the reception beam and the transmission beam.

8. A radar receiver comprising:
    the beam information generating device according to claim 1;
    a radar antenna including a plurality of antenna elements; and
    a beam generating circuit that forms the reception beams having the beam widths calculated by the beam information generating device with the radar antenna, wherein the beam generating unit beams are formed by using phase shifters and antenna elements, each of phase shifters being given weight coefficients for the antenna elements based on the beam widths and the calculated distances.

9. The radar receiver according to claim 8, further comprising:
    a data extracting circuit configured to extract pieces of data from a signal received by each reception beam at a constant time interval; and
    an estimating circuit configured to estimate a weather parameter based on the pieces of data extracted by the data extractor.

10. A beam information generating method performed by a computer which generates beam information required for a receiver to form a plurality of reception beams, the method comprising:
    arranging a plurality of models at a plurality positions in an area of a transmission beam formed by a transmitter, each of the models having a three-dimensional shape;
    calculating distances from the receiver to the models towards which reception beams are to be formed by the receiver, based on pre-given transmission beam information being information regarding the transmission beam; and
    calculating beam widths of reception beams based on the distances calculated and size information of the models wherein the reception beams are formed by using phase shifters and antenna elements, each of phase shifters being given weight coefficients for the antenna elements based on the beam widths and the calculated distances.

* * * * *